Sept. 23, 1969   A. BUISSON ET AL   3,468,057
PROCESS FOR THE CULTURE OF ALGAE AND APPARATUS THEREFOR
Filed May 10, 1967                                    2 Sheets-Sheet 1

INVENTORS
ANDRE BUISSON
PIERRE TRAMBOUZE
HUGO VAN LANDEGHEM
MICHEL REBELLER

BY  Paul M. Craig, Jr.
ATTORNEY

United States Patent Office 3,468,057
Patented Sept. 23, 1969

3,468,057
PROCESS FOR THE CULTURE OF ALGAE AND APPARATUS THEREFOR
Andre Buisson and Pierre Trambouze, Versailles, France, Hugo Van Landeghem, Anvers, Belgium, and Michel Rebeller, L'Etan-la-Ville, France, assignors to Institut Francais du Petrole des Carburants et Lubrifiants, Rueil-Malmaison, France
Filed May 10, 1967, Ser. No. 637,534
Claims priority, application France, May 31, 1966, 63,606; Mar. 3, 1967, 97,483
Int. Cl. A01g 7/02
U.S. Cl. 47—1.4   14 Claims

ABSTRACT OF THE DISCLOSURE

Apparatus and method of cultivating algae which involves the use of carbon dioxide as a nutrient as well as a means to propel the algae throughout a culture basin.

---

This invention relates to an improved process for the culture of algae and an apparatus adapted for carrying out said process.

In the French Patent 1,458,061 of Aug. 16, 1963 and the additional Patent 88,103 thereto, there is described a process for the culture of algae of the kind of the cyanophyceae algae, more particularly of the type of Spirulina maxima. These algae possess a high nutritiousness and can therefore be used as food.

The previously described process is quite satisfactory when used on a semi-industrial scale, but some difficulties arise when operating on a larger scale, particularly in natural or artificial basins of large size and low depth.

In such cases it is difficult to ensure a sufficient stirring of the culture medium and to feed it satisfactorily with a carbon dioxide-containing gas. The provision of stirrers and gas injectors distributed at numerous points of these basins requires a high investment and result in a high energy consumption and high losses in carbon dioxide. In spite of these inconveniences, the medium is far from being homogeneous and the algae are spoiled by the blades of the stirrers, the spoiled algae losing their cellular content, rich in proteins. These proteins are not recoverable by the algae, and it results therefrom: a yield decrease, and a decrease in growth.

Besides, undesirable bacteria growth (bacteria fed with proteins) which contaminate the culture and render it quickly unutilizable, is to be observed.

It has now been discovered that an excellent culture may be realized with a reduced investment and low consumption in energy and carbon dioxide by proceeding in the following manner: the culture is placed in a basin comprising at least two elongated and substantially horizontal zones, of small deepness and illuminated, and at least two inclined zones with an inclination of about from 30 to 90° with respect to horizontal and preferably substantially vertical, deeper than the preceding zones, each inclined zone being connected at its upper part to one of the horizontal zones, at one end ot it, each assembly of an inclined zone with the connected horizontal zone being separated from the adjacent assembly over its whole length, except two free communications, one at the lower parts of the inclined zones and the other at a point of the horizontal zones remote from the junction point between zones of different orientation.

This last-mentioned communication may also be placed in another assembly of inclined zones provided at the other end of the assembly of the two horizontal zones.

One of the inclined zones is fed at its lower part with carbon dioxide-containing gas whereas the adjacent communicating zone does not receive any gas feed.

By the effect of the gas, the culture liquid is moved and circulates through the entire apparatus. Simultaneously the liquid is being stirred and uniformly enriched in dissolved carbon dioxide. The concentration of the latter is kept sufficiently high in order to make unnecessary any gas feed during the traveling of the suspension of algae through the illustrated horozontal parts of the basins. The non-absorbed gas may be easily recovered at the top of the inclined zone which is fed with gas and reintroduced at the bottom of said last-mentioned zone.

It will then suffice to enclose the gaseous atmosphere above the inclined zone, the liquid escaping from said gas recuperation zone by passing through a siphon or any other equivalent means for liquid transfer. The liquid is thereafter allowed to travel in open air through the horizontal basins.

The produced algae or a part of their suspension in the culture medium can be separated in a known manner at any point of their circuit and at any time.

It is also described a process of the invention according to which a suspension of algae of the spirulina type in an aqueous medium containing the mineral salts necessary to their growth, having a pH value between 7.5 and 12, preferable between 8.5 and 10.5, is brought into contact with a carbon dioxide containing gas and then exposed to light, the periods of contact with gas having a duration of from 0.1 to 5 minutes, preferably from 1 to 30 seconds and the periods of exposure to light without substantial injection of carbon dioxide having a duration of from 5 minutes to 10 hours, preferably from 20 minutes to 4 hours.

More advantageously the respective durations of the first and second periods will be in a ratio comprised between $10^{-4}/1$ and $10^{-1}/1$, preferably between $10^{-3}/1$ and $10^{-2}/1$.

If this process is compared to a process where carbon dioxide is injected in a continuous manner, it is to be observed that the yield in algae with respect to the consumed carbon dioxide is substantially increased, which is quite unexpectable. Simultaneously the absorption rate of carbon dioxide is increased. Moreover the gas may be used as circulating agent, which is not possible in the case where injection is effected within the whole mass of liquid.

The invention will be further described with reference to the accompanying drawings, given by way of illustration only and which are not intended to limit the scope of the invention.

Figure 1:
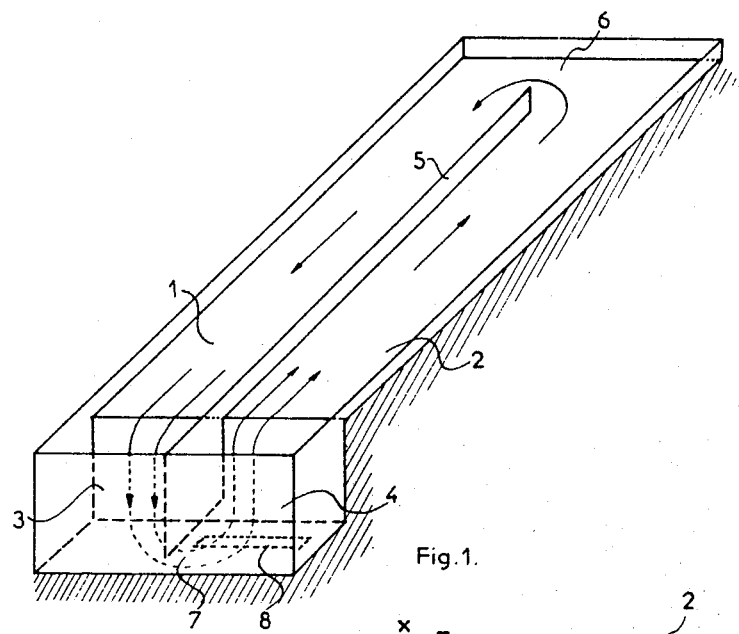
FIGURE 1 is a perspective view of the apparatus according to the invention.

FIGURE 1 shows a basin comprising two illuminated horizontal zones 1 and 2 and two vertical zones 3 and 4 separated by a wall 5 except at their ends 6 and 7. A row of gas jets or grid 8 for introduction of carbon dioxide-containing gas is provided at the lower part of zone 4. The basin is filled up with a suspension of algae in a nutrient aqueous phase. By the action of the gas, the suspension of algae is drawn upwardly in zone 4, which results in a suction of the suspension from the adjacent zone 3, the whole suspension being accordingly circulated in the direction shown on FIGURE 1 by the arrows.

Figure 2:
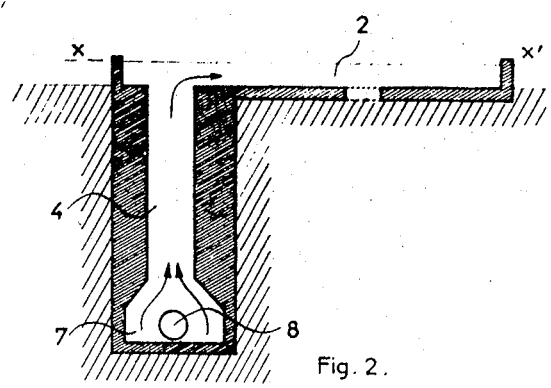
FIGURE 2 is a cross-sectional view of the inclined zone, preferably vertical through which the liquid ascends.

FIGURE 2 is cross-section of zone 4 by a vertical longitudinal plane of the basin (which corresponds to a side view). The level of the liquid phase therein is shown by the line XX'. Zone 4 comprises a narrowed part favoring the drawing of the liquid by the gas issuing from the row 8. This narrowing, although useful and favoring the circulation, is not however indispensable.

It must be understood that various modifications to the above described apparatus may be carried out by those skilled in the art without departing from the spirit of the invention which involves every embodiment including such modifications. By way of example the apparatus may be provided with deflectors in order to favor the stirring or to stop foam if any. In another embodiment the horizontal culture zone may be provided at each end with an inclined zone with gas stirring such as 4. Also a plurality of basins may be connected in series and/or in parallel. Some tests have been carried out with the use of a gas of combustion of propane containing from 10 to 11% by volume of carbon dioxide. When operating in open air without any other irradiation than that of the sun light (daylight duration of about 12 hours), there were obtained algae of the Spirulina maxima type with a yield of about 15 grams per day in a dried state and per square meter. The basin had a depth of 10 centimeters in its horizontal zone and 1 meter in its vertical zone.

In a basin having a surface of 3 square meters fed with gas at a rate of 200 liters per hour, the suspension of algae was obtained at a rate of 18.4 cubic meters per hour. With a gas feed up to 500 and 1,000 liters per hour respectively the corresponding liquid output were of 25.7 and 31.2 cubic meters per hour.

Figure 3:
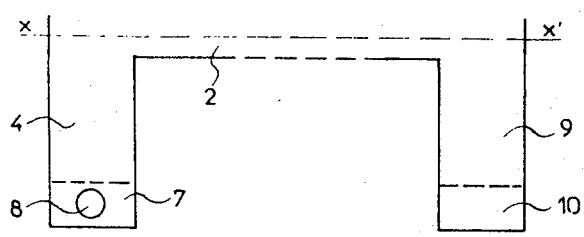
FIGURE 3 illustrates the association of two pairs of inclined zones.

FIGURE 3 is a cross-section of a basin comprising two pairs of vertical zones in combination with one pair of horizontal zones. The cross-section is made along a vertical longitudinal plane of the basin; only one vertical zone of each couple, respectively 4 and 9 and one horizontal zone 2 of each pair being shown on the drawing. Intercommunication zones are referred to as 7 and 10.

The vertical zone on the left of the drawing is an ascending zone for the liquid due to the gas injection from the row 8. The vertical zone on the right is a descending zone for the liquid which is not provided with gas injection means.

Figure 1A:
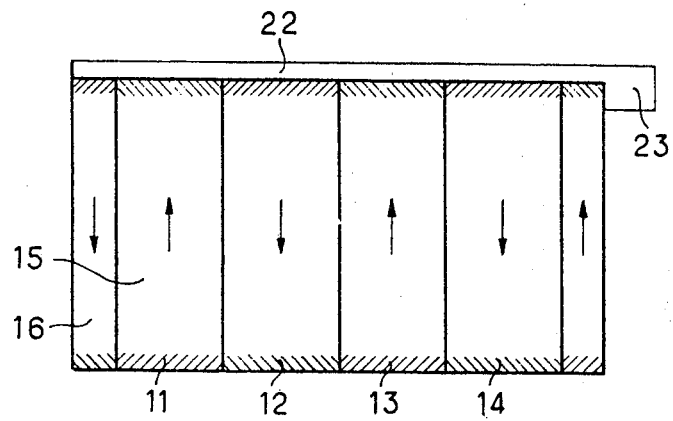
FIGURE 1A illustrates a view from above of a combination of a plurality of basins.

In a first improved embodiment of the apparatus a plurality of basins are associated in series or in parallel, for instance according to the diagram of FIGURE 1A where the hatched ending zones such as 11 and 13 represent, in a view from above, wells in which are injected gases, such as wells referenced 4 in FIGURE 2. On the contrary, the terminal zones oppositely hatched such as 12 and 14 represent wells without gas injection, such as well, reference 3 in FIGURE 1, wherein the liquid descends and ascends in the adjacent wells 11 and 13. The arrows show the direction of circulation of the culture medium in the horizontal zones such as 15, which correspond to the horizontal zones 1 and 2 in FIGURES 1 to 3.

All the wells located at one end of the horizontal zones are communicating with each other through their lower parts: for example 11 with 12, 12 with 13, 13 with 14 etc. . . . On the contrary it is preferred not to have any other communication points between basins. Wells such as 16 will be accordingly preferably continuous except at the above mentioned communicating points.

According to a modified embodiment a number of communication points at the lower part of the wells may be temporarily closed by obturation devices such as valves, gates, screens or the like, so as to separate two communicating zones such as illustrated in FIGURE 1 of the drawings, from the adjacent zones. This is particularly useful when starting the running of the installation or when collecting algae.

At the starting a pair of basins (FIG. 1 of the drawing) are seeded with algae and these basins are connected with the adjacent basins only when the culture has attained a sufficient stage of growth in said first pair of basins. It is thus possible, step by step, to seed all the basins.

Similarly, for collecting the algae from a pair of basins, this pair of basins may be separated from the adjacent basins where the culture is continued. The gas injection is stopped so as to allow the algae to come to the surface, and thereafter re-established at a low rate, thereby conveying the algae above a well without gas (reference 9 on FIGURE 2A). The valve 21 may then be opened so as to allow the algae with the upper part of the liquid to flow through the lateral channel 22 towards a filter or a centrifugal machine 23. The filtered liquid is recycled to the basins.

A second improvement consists of providing obstacles in the way of the liquid culture medium for various objects. The location of these obstacles is shown in FIGURE 2A which otherwise is similar to FIGURE 3, the references being the same.

Figure 2A:
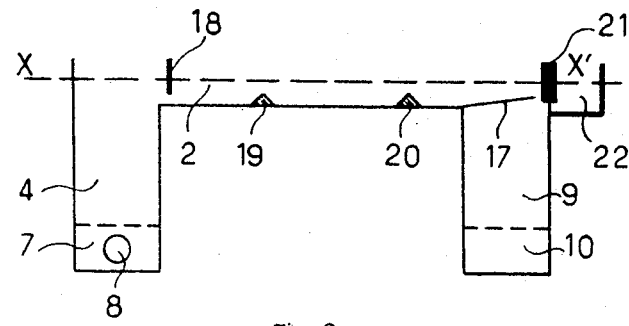

The additional elements shown in FIGURE 2A are substantially:

(a) A deflector 17, consisting for instance of a plate of metal or another material, which partly covers the downward well 9 from the point of arrival of the liquid phase and obliges the liquid to circulate rapidly at this end of the horizontal zone, thereby preventing the formation of a dead zone where algae accumulate.

If, in view of a collection, it is desired to cause the formation of an algae layer in said zone, it suffices to lower or to remove the deflector. By this way a preconcentration is obtained.

(b) A deflector 18, located at the inlet of the horizontal zone in the way of the liquid, and which plunges into the upper part of the liquid, which has the object of stopping the foams which may be collected, if necessary, by any convenient means, either by hand or mechanically.

(c) Obstacles such as 19 and 20 which may be placed in the way of the liquid in the horizontal part of the basins, generate a stirring of the culture medium and avoid the assemblage of algae at the surface or, on the contrary, their deposit on the bottom of the basins.

It is understood that the above mentioned improvements or modifications may be used either alone or in various combinations.

There are given hereunder some experimental results illustrating the operation of the device of this invention.

Two installations have been used:

The first are of the above-described type of 3 meters long, 1 meter wide, having a depth of 0.1 meter in its horizontal part and comprising a single gas well having a depth of 1.5 meters and illuminated with artificial light.

The second one, of 20 meters long, 4.5 meters wide, comprised 2 horizontal separated zones and two gas-fed wells of a depth of 1.1 meters. The depth of the horizontal basins was 0.07 meter. The light used was daylight.

The following results have been obtained:

|  | Gas feeding rate for well (m.$^3$ per hour) | Linear velocity of liquid (cm. per sec.) | Liquid flow rate (m.$^3$ per hour) | Yield in algae grams per m$^2$ and per day |
|---|---|---|---|---|
| First installation | 0.5 | 14.5 | 26.7 | 14 |
| Second installation | 2.59 | 9.7 | 55.4 | ([1]) |
|  | 1.88 | 7.7 | 44 |  |
|  | 0.99 | 5.7 | 32.5 |  |

[1] From 11 to 15 according to insolation and atmospheric conditions.

In the second installation, with a culture liquid of ph=9.5 and a gas feed of air having added thereto from 10 to 12% by volume of carbon dioxide, the absorption rates of $CO_2$ have been the following:

| Gas feeding rate (m³/hour) | Absorption rate, percent |
|---|---|
| 1.31 | 86 |
| 1.38 | 82 |
| 2.85 | 79 |

What is claimed as this invention is:

1. Basin for culture of algae in an aqueous nutrient medium, comprising, in combination, at least two illuminated horizontal zones, at least two inclined zones, and at least one gas injection means, each horizontal zone communicating by one of its ends with the upper end of one inclined zone, each assembly formed of a horizontal zone and of the communicating inclined zone being substantially separated from the adjacent assembly except for at least one point of the horizontal zones remote from the communication point with the communicating inclined zone and for at least one point of the inclined zones remote from said communication point, the gas injection means being placed in one of said inclined zones at a lower level than that of the bottom of the horizontal zones.

2. Basin for culture of algae in a nutrient medium according to claim 1, further comprising two additional inclined zones opposite said first inclined zones and in communication with the horizontal zone ends remote from said gas injection means, and a second gas injection means in one of said additional inclined zones.

3. Basin for culture of algae according to claim 2, wherein each assembly formed of two illuminated adjacent horizontal zones with the four associated inclined zones communicates in at least one point with an identical adjacent assembly.

4. Basin for culture of algae according to claim 3 wherein the communicating point between adjacent assemblies is in the inclined zones thereof.

5. Basin according to claim 3, further comprising means for obturating the communication points between adjacent assemblies of two horizontal zones with the four associated inclined zones.

6. Basin according to claim 1, further comprising deflector means at the upper part of at least one inclined zone.

7. Basin according to claim 1, further comprising deflector means in at least one of the horizontal zones.

8. Basin according to claim 1 wherein the inclination angle of the inclined zones with respect to horizontal is between 30 and 90°.

9. A process for the culture of algae in an aqueous nutrient medium using carbon dioxide as carbon source comprising a continuous circular motion of said medium containing algae in suspension, by injecting a stream of carbon dioxide containing gas at the lower part of an ascending sector of the circuit, the liquid medium thereafter circulating outside from said ascending zone without further gas injection and returning to the lower part of the ascending zone.

10. A process according to claim 9 wherein the algae are of the Spirulina type.

11. A process of culture of algae according to claim 9, wherein the algae suspension in the liquid aqueous nutrient medium of pH value comprised between 7.5 and 10.5 is alternately brought into contact, in a first period of from 0.1 second to 5 minutes, with a carbon dioxide-containing gas and in a second period exposed to light without substantial addition of carbon dioxide for from 5 minutes to 10 hours.

12. A process according to claim 11 wherein the ratio of the respective durations of the first and second periods is comprised between $10^{-4}/1$ and $10^{-1}/1$.

13. A process according to claim 11 wherein the algae are of the Spirulina type.

14. A process of culture of algae according to claim 9, wherein the suspension of algae in the liquid nutrient aqueous medium of pH value comprised between 7.5 and 10.5 is alternately brought into contact for from 1 to 30 seconds with a carbon dioxide-containing gas and exposed to light, without substantial addition of carbon dioxide, for from 20 minutes to 4 hours.

References Cited

UNITED STATES PATENTS

| | | | |
|---|---|---|---|
| 2,007,479 | 7/1935 | Salles et al. | 119—4 |
| 2,658,310 | 11/1953 | Cook | 47—1.4 |
| 2,732,663 | 1/1956 | Dewey | 47—1.4 |
| 3,303,608 | 2/1967 | Hannan | 47—1.4 |

ROBERT E. BAGWILL, Primary Examiner

U.S. Cl. X.R.

195—143